United States Patent Office 3,406,023
Patented Oct. 15, 1968

3,406,023
HERBICIDAL METHOD
Harvey M. Loux, Valley View, Del., assignor to E. I. du Pont de Nemours and Company, Wilmington, Del., a corporation of Delaware
No Drawing. Continuation-in-part of application Ser. No. 590,545, Oct. 31, 1966. This application Dec. 13, 1967, Ser. No. 690,078
12 Claims. (Cl. 71—92)

ABSTRACT OF THE DISCLOSURE

Novel hydrouracils of the following formula:

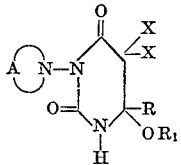

wherein X, R, $R_1$ and

are as defined hereinafter are useful as herbicides.

Exemplary of such compounds is 5,5-dichloro-3-(hexahydro-1-azepinyl)-6-methoxy-6-methylhydrouracil.

CROSS REFERENCE TO RELATED APPLICATIONS

This application is a continuation-in-part application of my copending application, Ser. No. 590,545, filed Oct. 31, 1966, which in turn is a continuation-in-part of my copending application Ser. No. 416,628, filed Dec. 7, 1964, which in turn is a continuation-in-part application of my then copending application, Ser. No. 159,768, filed Dec. 15, 1961, all now abandoned.

BRIEF SUMMARY OF THE INVENTION

This invention relates to a novel class of hydrouracils and to compositions and methods for using these hydrouracils as herbicides.

The hydrouracils of this invention are represented by the following formula:

(I)

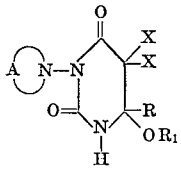

wherein

is a cycloimino group selected from the group consisting of monocyclic heterocyclic groups containing from 3 through 8 ring atoms and bicyclic heterocyclic groups containing 7 through 12 ring atoms; provided that the cycloimino group must contain one nitrogen atom bonding the group to the uracil nucleus; provided that the cycloimino group can contain 0 to 2 additional hetero atoms selected from the group consisting of oxygen, nitrogen and sulfur; and further provided that the cycloimino group can be substituted with a member selected from the group consisting of hydroxy, alkyl of 1 through 4 carbon atoms, and hydroxyalkyl of 1 through 4 carbon atoms;

X is chlorine or bromine;
R is methyl or ethyl;
$R_1$ is hydrogen or alkyl of 1 through 4 carbon atoms; provided that when $R_1$ is alkyl, X is chlorine, and when $R_1$ is hydrogen, X is bromine.

Preferred in view of the ease in obtaining starting materials are the compounds within the above scope where

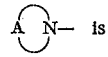 is azacycloalkyl of 3 through 8 ring atoms,
azacycloalkenyl of 5 through 7 ring atoms,
azabicycloalkyl of 7 through 11 ring atoms,
diazacycloalkyl of 5 through 8 ring atoms,
azabicycloalkenyl of 9 through 11 ring atoms,
azaoxacycloalkyl of 5 through 8 ring atoms,
azaoxacycloalkenyl of 5 through 8 ring atoms,
diazabicycloalkenyl of 7 through 11 ring atoms,
azaoxabicycloalkyl of 8 through 10 ring atoms,
azaoxabicycloalkenyl of 9 through 11 ring atoms,
azadioxacycloalkyl of 5 through 8 ring atoms,
azathiacycloalkyl of 5 through 7 ring atoms,
azadithiacycloalkyl of 5 through 8 ring atoms,
azathiacycloalkenyl of 5 through 7 ring atoms,
azathiabicycloalkyl of 9 and 10 ring atoms, or
azathiabicycloalkenyl of 9 and 10 ring atoms.

As previously set forth, these groups must have a nitrogen atom bonding the group to the uracil nucleus, can contain 1 or 2 additional hetero atoms, and can be substituted with hydroxy, alkyl of 1 through 4 carbon atoms, or hydroxyalkyl of 1 through 4 carbon atoms.

With respect to the above groups, it is of course understood that they can conventionally be named in other ways. Thus, 1,3-diazabicyclo(3.4.0)nona-2,4,6,8-tetraen-1-yl, i.e., an azabicycloalkenyl group is conventionally termed 1-benzimidazolyl.

Most preferred are the compounds where

is azacycloalkyl of 5 through 7 ring atoms or azaoxacycloalkyl of 5 through 6 ring atoms, the groups being substituted with 0 through 4 methyl groups and containing 1 or 2 heteroatoms.

Exemplary of such compounds are:

5,5-dichloro-3-(hexahydro-1-azepinyl)-6-methoxy-6-methylhydrouracil
5,5-dibromo-6-hydroxy-6-methyl-3-(1-piperidino)-hydrouracil
5,5-dichloro-6-methoxy-6-methyl-3-(1-piperidino)-hydrouracil
5,5-dichloro-6-methoxy-6-methyl-3-(1-pyrrolidinyl)-hydrouracil
5,5-dibromo-6-hydroxy-6-methyl-3-(1-pyrrolidinyl)-hydrouracil
5,5-dibromo-3-(hexahydro-1-azepinyl)-6-hydroxy-6-methylhydrouracil
5,5-dichloro-6-methoxy-6-methyl-3-(1-piperazinyl)-hydrouracil
5,5-dichloro-6-methoxy-6-methyl-3-(4-morpholino)-hydrouracil.

As is well known in the art, herbicidal compounds frequently are utilized in the form of a herbicidal equivalent derivative thereof for some formulating or handling advantage the derivative may provide over the compound per se. Similarly, it is to be understood that also included within the scope of this invention are addition compounds or complexes of the hydrouracils of Formula 1 which can be formed from Lewis acids and which exert a herbicidal effect similar to that of the hydrouracils per se. Lewis acids are generally described in the following texts: (1) J. Hine, Physical Organic Chemistry, McGraw-Hill Book Company, Inc., New York, 1956, chapter 2; (2) W. F. Luder and S. Zuffanti, The Electronic Theory of Acids and Bases, John Wiley and Sons, Inc., New York, 1946; (3) E. S. Gould, Mechanism and Structure in Organic Chemistry, Holt, Rinehart and Winston, New York, 1959, chapter 4; (4) E. M. Arnett, Progress in Physical Organic Chemistry, vol. 1, edited by S. G. Cohen, A. Streitwieser, Jr., and R. W. Taft, Interscience Publishers, Inc., New York, 1963, chapter entitled, "Quantitative Comparisons of Weak Organic Bases"; and (5) G. A. Olah, Editor, Friedel-Crafts and Related Reactions, volumes 1 and 2, Interscience Publishers, Inc., New York, 1963.

Non-limiting illustrations of compounds shown in the above texts which can be used to form addition compounds or complexes with the hydrouracils of Formula 1 for purposes of the present invention are:

Phenols,
Cresols,
Naphthols
Friedel-Crafts catalysts,
Halogenated benzoic acids,
Mineral acids,
Organic sulfonic acids,
Organic aliphatic acids,
Halogenated aliphatic acids,
Aromatic acids, and
Halogenated aryloxyaliphatic acids.

Preferred for use according to the invention due to their economical effectiveness as herbicides are hydrouracils within the scope of Formula 1 wherein X is chlorine and $R_1$ is alkyl of 1 through 2 carbon atoms and R is methyl.

In Formula 1, the

cycloimino group in the 3-position of the hydrouracil ring can include but is not limited to such groups as

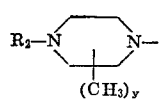

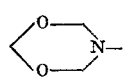

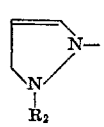

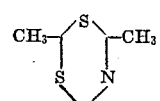

where $R_2$ is alkyl of 1 through 4 carbon atoms or —$CH_2CH_2OH$ and y is 0–4. It is obvious from the above that the term "cycloimino" as used herein includes heteroatoms but it is intended in accordance with the invention that the number of hetero atoms in the

group of the 3-position of the uracil ring does not exceed three and they are oxygen, nitrogen, or sulfur.

DESCRIPTION OF THE INVENTION

Those compounds of Formula 1 are prepared by halogenation in the appropriate solvent of uracils of the following structure:

(2)

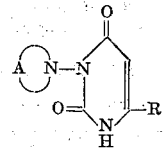

where

and R are as described above. The synthesis of these starting uracils is described in my copending application Ser. No. 416,623, filed Dec. 7, 1964 now abandoned.

Those compounds of Formula 1 having X=chlorine and $R_1$=alkyl of 1 through 4 carbon atoms are prepared by adding chlorine slowly at 0–20° C. to a stirred solution of the starting uracil in the appropriate alcohol (3).

(3)

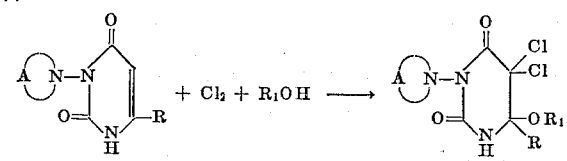

Those compounds of Formula 1 in which X is bromine and $R_1$ is hydrogen are prepared by adding bromine gradually at room temperatures to a stirred slurry of the starting uracil in water 4.

(4)

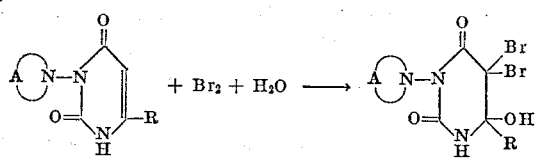

The hydrouracils of this invention have outstanding herbicidal effectiveness. They are particularly active as post-emergence sprays at levels of from about 3 to 45 pounds of active material per acre for the control of annual grasses and broadleaf weeds, especially perennial grasses such as Johnsongrass, quackgrass, Bermudagrass, and nutsedge growing on railroad ballast, on industrial sites, or on and adjacent to cropland in agricultural areas. They are also useful for the post- and pre-emergence control of annular grass and broadleaf seedlings when used as a spray at a rate of about ½ to 4 pounds per acre. Still another important use for the compounds of this invention is for pre-emergence and post-emergence control of a wide spectrum of weeds and brush on industrial and railroad ballast sites using levels of about 5 to 45 pounds of active material per acre.

In general, one uses the compounds of this invention at levels of at least about ¼ pound of active material per acre to obtain herbicidal effectiveness, the exact amount used being dependent upon the particular situation involved.

The compounds of this invention are preferably formulated with pest-control adjuvants, modifiers, or diluents, hereinafter generically called inert carriers. Formulation facilitates handling and often actually enhances herbicidal action. Such herbicidal formulations are prepared in the form of either powdered solids, granules, pellets, or liquids.

The liquid compositions, whether solutions or dispersions of the compounds of this invention in a liquid solvent, and also the wettable powders, contains as a conditioning agent one or more surface-active agents in amounts sufficient to render a given composition containing the compounds of this invention readily dispersible in water or in oil. By the term "surface-active agent," it is understood that wetting agents, dispersing agents, suspending agents, and emulsifying agents are included.

Surface active agents suitable for use in the compositions of this invention are set forth, for example, in Searle, U.S. Patent No. 2,426,417; Todd, U.S. Patent No. 2,655,447; or Jones, U.S. Patent No. 2,412,510. See also Lenher et al., U.S. Patent No. 2,139,276. A detailed list of surface-active agents is set forth in McCutcheon, "Detergents and Emulsifiers," 1966 Annual.

Preferred wetting agents are alkylene-benzene and alkylnaphthalene sulfonates, sulfated fatty alcohols, amines or acid amides, esters of sodium sulfosuccinates, petroleum sulfonates, sulfonated vegetable oils, polyethioylated long chain alcohols and substituted phenols.

Preferred dispersants are methyl cellulose, polyvinyl alcohols, sodium lignin sulfonates, polymeric alkylnaphthalene sulfonates, and sodium-N-methyl-N-(long chain acid) tomates.

In preparing herbicidal compositions, surface-active agents are generally employed at concentrations of from about 1–10%, by weight. Levels as high as 0.5 to 6 parts for each part of hydrouracil, however, give unusual and unexpected beneficial results. Such compositions have a greater herbicidal effectiveness than can be expected from a consideration of the activity of the components used separately.

Powdered or dust compositions of the invention, whether or not also modified with a surface-active agent, are prepared by mixing the active ingredient with finely divided inert solid carriers. Such carriers are preferably talcs, natural clays, pyrophyllite, diatomaceous earth, and flours such as walnut shell, wheat, redwood, soya bean, and cottonseed. Other inert solid carriers which can be used include magnesium and calcium carbonates, calcium phosphates, sulfur, lime, etc., either in powder or granular form. The percentage by weight of the active ingredient will vary according to the manner in which the composition is to be applied, but in general, will be from about 0.5 to 95% by weight of the herbicidal composition.

Granule or pellet compositions can be prepared by mixing the active material in finely divided form with clays (with or without water soluble binders), moistening the mixture with 15–20% water, extruding the mass under pressure through an orifice, then cutting the extrusions to size before drying to yield pellets or first drying, then granulating to yield granules. Alternatively granules, but usually not pellets, can be made by spraying active material in solution or suspension upon the surface of a preformed granule of clay, vermiculite, or other suitable granular material. When the active material is soluble in the spray medium so it can penetrate into the pores of the granular carrier no binding agent is needed. When it is insoluble and suspended, a binder is needed to adhere the active material to the surface. The binder can be soluble such as goulac, or dextrin or colloidally soluble such as swollen starch, glue or polyvinyl alcohol. The final step in either case is to remove the liquid medium, whether solvent or carrier. The percentage of the active ingredient may vary from 1–80% but is usually 3–25% of the herbicidal composition.

Herbicidal compositions of this invention can also be prepared by dispersing the active ingredient in an aqueous or inert non-aqueous carrier. Aliphatic hydrocarbons and hydrocarbons of petroleum origin are preferred as non-aqueous carriers. These dispersions are prepared by milling the uracils with dispersing agents and suspending agents and inert carriers in mills such as pebble or sand mills. The amount of the herbicide in the dispersion may be from 10% or less to 50% of the aqueous or oil dispersion.

The particles in such dispersions may range from about 0.1 to 50 microns although the majority are preferably in the range of from about 0.5–5 microns in average diameters. In general, the oils used are aliphatic hydrocarbons and mixtures thereof, particularly those derived from petroleum and having a boiling point in the range from about 125 to 400° C. A hydrocarbon oil having a lower boiling point is less desirable because when sprayed from a nozzle, such a hydrocarbon tends to volatilize undesirably. Furthermore, low-boiling hydrocarbons present a serious fire hazard.

Emulsifiable oils are usually solutions of active material in non-water miscible solvents together with a surfactant.

For the compounds of this invention, emulsifiable oils can be made be mixing the active ingredient with a solvent and surfactant. Suitable solvents for the compounds of this invention are aromatic hydrocarbons (substituted or unsubstituted), and non-water miscible ethers, esters, or ketones. Suitable surfactants are those anionic or non-ionic agents known to the art as emulsifying agents. Such compounds can be found listed by J. B. McCutcheon in Detergents and Emulsifiers—1966 Annual.

Emusifying agents most suitable for the compositions of this invntion are alkyl aryl polyethoxy alcohols, alkyl and alkyl aryl polyether alcohols, polyoxyethylene sorbitol or sorbitan fatty acid esters, polyethylene glycol fatty esters, fatty alkylol amide condensates, amine salts of fatty alcohol sulfates plus long chain alcohols and oil soluble petroleum sulfonates. Such emulisfying agents will comprise from about 3–10 weight percent of the total composition. As described above, however, up to 6 parts of emulsifying agent for each part of hydrouracil can be used to give synergistic results.

Thus, emulsifiable oil compositions of the present invention will consist of from about 25–70 weight percent hydrouracil or hydrouracil-phenol complex, about 20–72 weight percent solvent, and about 3–10 weight percent emulsifier, as these terms are defined and used above.

In some situations it is desirable that the active hydrouracil herbicide be released slowly from a carrier. Such compositions are particularly useful for application to gravel and cinder driveways and the like, where they release their herbicidal ingredients slowly over a long period of time and thus eliminate the necessity for frequent application.

Such compositions are made by incorporating the hydrouracil into a solid or semi-solid matrix of a material such as Portland cement or calcium sulfate. The hydrouracils will be present in these compositions in varying concentrations depending upon the ultimate use of the products. Generally, they will contain from 1% to 40%, by weight, of hydrouracil. They can be prepared by any of the well-known techniques, such as granulating or pelletizing.

Herbicidal formulations can also be prepared containing a fungicide or bactericide. When such compositions are applied to the soil, the fungicidal or bactericidal ingredients retard the breakdown of the uracils by soil microorganisms and thus renders them stable over a longer period of time. The fungicides and bactericides which can be incorporated into these compositions can be any of the well-known products such as, for example, antibiotics such as penicillin, phenols, thiocarbamates, and the like. The amount of microbiocide to be included in such compositions will naturally vary with their ultimate use. Generally, however, they will contain from 1% to 70% of a microbiocide.

The hydrouracils of this invention can also be incorporated into paints, particularly marine paints, for application to surfaces where the growth of plants such as algae is undesirable. Such compositions are prepared by dissolving or suspending the hydrouracil in a paint-compatible solvent. Hydrouracils will be present in such comcentrations of from 1% to 10%.

The hydrouracils and hydrouracil-phenol complexes of this invention can also be dissolved in a suitable solvent or dispersed in a suitable carrier, and impregnated into wooden objects such as construction timbers or railroad ties. When these objects are placed in or near the ground, the uracils slowly leach from them, thus preventing the growth of weeds in the nearby areas.

Such wooden objects can also be floated on the surface of water in which undesirable aquatic growth is present. Again, the uracil is slowly leached from the wood and prevents growth of nearby aquatic weeds for extended periods.

The concentration of hydrouracils to be impregnated into any such wooden object will vary according to the nature of the wood and the type of weed to be controlled.

Optionally, adhesives such as gelatin, blood albumin, resins, for example, rosin alkyl resins and the like can also be used in certain compositions to increase retention or tenacity of deposits following applications.

The herbicidal compositions of this invention can be formulated to contain two or more of the hydrouracils. They can also be formulated to contain other known herbicides in addition to the hydrouracils.

Among the known herbicides which can be combined with the hydrouracils of this invention are:

Substituted ureas 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea These ureas can be mixed with the hydrouracils of this invention in proportions of from 1:4 to 4:1, respectively, the preferred ratio being 1:2 to 2:1.

Substituted triazines 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-methoxy-4,6-bis(ethylamino)-s-triazine
2-methoxy-4-ethylamino-6-isopropylamino-s-triazine
2-chloro-4,6-bis(isopropylamino)-s-triazine These triazines can be mixed with the hydrouracils of this invention in proportions of from 1:4 to 4:1, respectively, the preferred ratio being 1:2 to 2:1.

Phenols

Dinitro-o-sec-butylphenol and its salts
Pentachlorophenol and its salts

These phenols can be mixed with the hydrouracils of this invention in the proportions of 1:10 to 20:1, respectively, the preferred ratio being 1:5 to 5:1.

Carboxylic acids and derivatives

These carboxylic acids and derivatives can be mixed with the hydrouracils of this invention in the listed proportions.

2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
3-amino-2,5-dichlorobenzoic acid and its salts
3-nitro-2,5-dichlorobenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
2-(2,4,5-trichlorophenoxy)ethyl-2,2-dichloro-propionate
4-(2,4-dichlorophenoxy)butyric acid and its salts and esters
4-(2-methyl-4-chlorophenoxy)butyric acid and its salts and esters Mixed in a 1:16 to 8:1 ratio, preferably a 1:4 to 4:1 ratio.

2,6-dichlorobenzonitrile

Mixed in a 1:4 to 4:1 ratio, preferably a 1:3 to 3:1 ratio.

Trichloroacetic acid and its salts

Mixed in a 1:2 to 25:1 ratio, preferably a 1:1 to 8:1 ratio.

2,2-dichloropropionic acid and its salts

Mixed in a 1:4 to 8:1 ratio, preferably a 1:2 to 4:1 ratio.

N,N-dipropylthiolcarbamic acid, ethyl ester
n-Propyl-N,N-propylthiolcarbamate
n-Propyl-N-ethyl-n-butylthiolcarbamate Mixed in a 1:2 to 24:1 ratio, preferably a 1:1 to 12:1 ratio.

N-phenylcarbamic acid, isopropyl ester
N-(m-chlorophenyl)carbamic acid, isopropyl ester
N-(m-chlorophenyl)carbamic acid, 4-chloro-2-butynyl ester Mixed in a 1:2 to 24:1 ratio, preferably a 1:1 to 12:1 ratio.

2,3,6-trichlorophenylacetic acid and its salts

Mixed in a 1:12 to 8:1 ratio, preferably a 1:4 to 4:1 ratio.

2-chloro-N,N-diallylacetamide
Maleic hydrazide

Mixed in a 1:2 to 10:1 ratio, preferably a 1:1 to 5:1 ratio.

Inorganic and mixed inorganic-organic salts

These salts can be mixed with the hydrouracils of this invention in the listed proportions.

Calcium propylarsonate
Disodium monomethylarsonate
Octyl-dodecylammoniummethylarsonate Mixed in a 1:4 to 4:1 ratio, preferably a 1:2 to 2:1 ratio.

Sodium arsenite

Mixed in a 1:5 to 40:1 ratio, preferably a 1:4 to 25:1 ratio.

Lead arsenate
Calcium arsenate

Mixed in a 150:1 to 600:1 ratio, preferably a 100:1 to 400:1 ratio.

Sodium tetraborate hydrated, granulated
Sodium metaborate
Sodium pentaborate
Polyborchlorate
Unrefined borate ore such as borascu Mixed in a 6:1 to 1500:1 ratio, preferably a 3:1 to 1000:1 ratio.

Sodium chlorate

Mixed in a 2:1 to 40:1 ratio, preferably a 1:1 to 20:1 ratio.

Ammonium sulfamate

Mixed in a 1:1 to 100:1 ratio, preferably 1:1 to 50:1 ratio.

Other organic herbicides 5,6-dihydro-(4A,6A)-dipyrido-(1,2-A,2′,1′-C) pyrazinium dibromide
1,1′-dimethyl-4,4′-dipyridinium di-(methyl-sulfate)

Mixed in a 1:20 to 16:1 ratio, preferably a 1:5 to 5:1 ratio.

3-amino-1,2,4-triazole

Mixed in a 1:20 to 20:1 ratio, preferably a 1:5 to 5:1 ratio.

3,6-endoxohexahydrophthalic acid

Mixed in a 1:3 to 20:1 ratio, preferably a 1:2 to 10:1 ratio.

Hexachloroacetone

Mixed in a 1:2 to 16:1 ratio, preferably a 1:1 to 8:1 ratio.

Diphenylacetonitrile
N,N-dimethyl-α,α-diphenylacetamide
N,N-di-n-propyl-2,6-dinitro-4-trifluoromethyl-aniline
N,N-di-n-propyl-2,6-dinitro-4-methylaniline Mixed in a 1:10 to 30:1 ratio, preferably a 1:5 to 20:1 ratio.

O-(2,4-dichlorophenyl)-O-methyl-isopropylphosphoramidothiate
2,3,5,6-tetrachloroterephthalic acid, dimethyl ester Mixed in a 1:4 to 20:1 ratio, preferably a 1:3 to 15:1 ratio.

Substituted uracils

These hydrouracils can be mixed with substituted uracils, in the proportions listed below. Methods for the preparation of the listed uracils which are novel can be found in copending application Ser. Nos. 233,952, filed Oct. 29, 1962, now abandoned and 232,311, filed Oct. 22, 1962, now U.S. Patent 3,235,360.

3-cyclohexyl-6-methyluracil
3-cyclohexyl-6-ethyluracil
3-cyclohexyl-6-sec-butyluracil
3-norbornyl-6-methyluracil
3-cyclopentyl-6-methyluracil
3-cyclohexyl-6-isopropyluracil Mixed in a 1:4 to 4:1 ratio, preferably a 1:2 to 2:1 ratio.

3-cyclohexyl-5,6-trimethyleneuracil
3-sec-butyl-5,6-trimethyleneuracil
3-isopropyl-5,6-trimethyleneuracil
3-isopropyl-5,6-tetramethyleneuracil
3-isopropyl-5,6-pentamethyleneuracil Mixed in a 1:6 to 6:1 ratio, preferably a 1:4 to 4:1 ratio.

3-cyclohexyl-5-bromouracil
3-cyclohexyl-5-chlorouracil
3-isopropyl-5-bromouracil
3-sec-butyl-5-bromouracil
3-sec-butyl-5-chlorouracil
5-bromo-3-sec-butyl-6-methyluracil
5-bromo-3-sec-butyl-6-methyluracil, sodium salt
5-chloro-3-sec-butyl-6-methyluracil
5-bromo-3-tert-butyl-6-methyluracil
5-chloro-3-tert-butyl-6-methyluracil
5-bromo-3-(1-ethylpropyl)-6-methyluracil
5-chloro-3-(1-ethylpropyl)-6-methyluracil
5-bromo-3-isopropyl-6-methyluracil
5-chloro-3-isopropyl-6-methyluracil
5-bromo-3-cyclohexylmethyl-6-methyluracil
5-chloro-3-cyclohexylmethyl-6-methyluracil
3-cyclohexyl-5-methoxy-6-methyluracil
3-sec-butyl-5,6-dimethyluracil
5-bromo-6-methyl-3-norbornylmethyluracil
3-sec-butyl-6-methyl-5-nitrouracil
3-cyclohexyl-5,6-dimethyluracil
5-bromo-3-cyclohexyl-6-methyluracil
5-chloro-3-phenyl-6-methyluracil Mixed in a 1:6 to 6:1 ratio, preferably a 1:2 to 2:1 ratio.

3-isopropyl-1-trichloromethylthio-5-bromo-6-methyluracil
3-cyclohexyl-1-trichloromethylthio-5-bromo-6-methyluracil
3-sec-butyl-1-acetyl-5-bromo-6-methyluracil
3-isopropyl-1-acetyl-5-bromo-6-methyluracil
3-isopropyl-1-trichloromethylthio-5-chloro-6-methyluracil Mixed in a 1:4 to 4:1 ratio, preferably a 1:2 to 2:1 ratio.

The rate of application for compounds of this invention will, of course, vary with the particular end result desired, the particular use to which the compounds are put, the particular plant involved, the formulation used, the mode of application, the prevailing weather conditions, the foliage density, and the like. Since so many variables play a role, it is not possible to indicate generally a particular rate of application suitable for all situations. Certain particular usage rates that are found to be effective can be suggested, but it must be understood the determination of the optimum particular rate for use in any given instance is conventional procedure to those skilled in the art.

In order that the invention may be better understood, the following examples are given, wherein all parts and proportions are by weight unless indicated otherwise.

EXAMPLE 1

5,5-dichloro-3-(hexahydro-1-azepinyl)-6-methoxy-6-methyl-hydrouracil

A solution of 8.92 parts by weight of 3-(hexahydro-1-azepinyl)-6-methyluracil in 50 parts of methanol is stirred at 15–20° C. while 5.68 parts by weight of chlorine is slowly added. The reaction is quite exothermic during the first half of the chlorine addition, making external cooling necessary. The solution is stirred 1½ hours longer, then the excess methanol is removed under reduced pressure. The residue consists of 10.8 parts of 5,5-dichloro - 3-(hexahydro-1-azepinyl)-6-methoxy-6-methyl-hydrouracil. It is sufficiently pure for herbicidal formulation, but may be purified, if desired, by recrystallization from nitromethane.

By substituting equivalent amounts of the appropriate starting uracil and alcohol for the 3-(hexahydro-1-azepinyl)-6-methyluracil set forth above, the hydrouracils listed in Table I can be prepared.

TABLE I

| Starting Uracil | Alcohol | Hydrouracil Product |
|---|---|---|
| 3-(hexahydro-1-azepinyl)-6-ethyluracil | Methanol | 5,5-dichloro-6-ethyl-3-(hexahydro-1-azepinyl)-6-methoxyhydrouracil. |
| 6-methyl-3-(4-morpholino)uracil | do | 5,5-dichloro-6-methoxy-6-methyl-3-(4-morpholino)hydrouracil. |
| 3-(hexahydro-1-azepinyl)-6-methyluracil | Butanol | 6-butoxy-5,5-dichloro-3-(hexahydro-1-azepinyl)-6-methylhydrouracil. |
| 6-methyl-3-(1-piperidino)uracil | Ethanol | 5,5-dichloro-6-ethoxy-6-methyl-3-(1-piperidino)hydrouracil. |
| 6-methyl-3-(1-piperidino)uracil | Methanol | 5,5-dichloro-6-methoxy-6-methyl-3-(1-piperidino)hydrouracil. |
| 6-methyl-3-(1-pyrrolidinyl)uracil | Propanol | 5,5-dichloro-6-methyl-6-propoxy-3-(1-pyrrolidinyl)hydrouracil. |
| 3-(dihydro-1,3,5-dithiazin-5-yl)-6-methyluracil | Isopropanol | 5,5-dichloro-3-(dihydro-1,3,5-dithiazin-5-yl)-6-methyl-6-isopropoxyhydrouracil. |
| 3-(dihydro-2,4,6-trimethyl-1,3,5-dithiazin-5-yl)-6-methyluracil | Ethanol | 5,5-dichloro-3-(dihydro-2,4,6-trimethyl-1,3,5-dithiazin-5-yl)-6-ethoxy-6-ethyluracil. |
| 6-methyl-3-(1,2,3,6-tetrahydro-1-pyridyl)uracil | Methanol | 5,5-dichloro-6-methoxy-6-methyl-3-(1,2,3,6-tetrahydro-1-pyridyl)hydrouracil. |
| 6-ethyl-3-(4-methyl-1-piperazinyl) uracil | do | 5,5-dichloro-6-ethyl-6-methoxy-3-(4-methyl-1-piperazinyl)hydrouracil. |
| 6-methyl-3-(2-methyl-1-piperidino) uracil | Propanol | 5,5-dichloro-6-propoxy-6-methyl-3-(2-methyl-1-piperidino)hydrouracil. |
| 6-methyl-3-(1-piperazinyl)uracil | Methanol | 5,5-dichloro-6-methoxy-6-methyl-3-(1-piperazinyl)hydrouracil. |
| 6-ethyl-3-(2-methyl-4-pyrazolin-1-yl)uracil | Ethanol | 5,5-dichloro-6-ethoxy-6-ethyl-3-(2-methyl-4-pyrazolin-1-yl)hydrouracil. |
| 6-methyl-3-(tetrahydro-1,4-thiazin-4-yl)uracil | Butanol | 6-butoxy-5,5-dichloro-6-methyl-3-(tetrahydro-1,4-thiazin-4-yl)hydrouracil. |
| 3-(dihydro-1,3,5-dioxazin-5-yl)-6-methyluracil | Methanol | 5,5-dichloro-3-(dihydro-1,3,5-dioxazin-5-yl)-6-methoxy-6-methylhydrouracil. |
| 6-ethyl-3-(1,2,3,4-tetrahydro-2-isoquinolyl)uracil | Ethanol | 5,5-dichloro-6-ethoxy-6-ethyl-3-(1,2,3,4-tetrahydro-2-isoquinolyl)hydrouracil. |
| 3-[4-(2-hydroxyethyl)-1-piperazinyl]-6-methyluracil | Methanol | 5,5-dichloro-3-[4-(2-hydroxyethyl)-1-piperazinyl]-6-methoxy-6-methylhydrouracil. |
| 6-methyl-3-(2-methyl-1-aziridinyl)uracil | do | 5,5-dichloro-6-methoxy-6-methyl-3-(2-methyl-1-aziridinyl)hydrouracil. |
| 6-methyl-3-(2,3,5,6-tetramethyl-1-piperazinyl)uracil | do | 5,5-dichloro-6-methoxy-6-methyl-3-(2,3,5,6-tetramethyl-1-piperazinyl)hydrouracil. |
| 3-[2-(3-hydroxypropyl)-2-methyl-1-pyrrolidinyl]-6-methyluracil | do | 5,5-dichloro-3-[2-(3-hydroxypropyl)-2-methyl-1-pyrrolidinyl]-6-methoxy-6-methylhydrouracil. |
| 6-methyl-3-(1-pyrrolyl)uracil | Ethanol | 5,5-dichloro-6-ethoxy-6-methyl-3-(1-pyrrolyl)hydrouracil. |
| 3-(1-aziridinyl)-6-methyluracil | do | 3-(1-aziridinyl)-5,5-dichloro-6-methoxy-6-methylhydrouracil. |
| 3-(dihydro-2,4,6-trimethyl-1,3,5-dithiazin-5-yl)-6-methyluracil | do | 5,5-dichloro-3-(dihydro-2,4,6-trimethyl-1,3,5-dithiazin-5-yl)-6-ethoxy-6-methylhydrouracil. |
| 3-(octahydro-1-azocinyl)-6-methyluracil | do | 5,5-dichloro-6-ethoxy-3-(octahydro-1-azocinyl)-6-methylhydrouracil. |
| 3-(1-azepinyl)-6-methyluracil | Methanol | 3-(1-azepinyl)-5,5-dichloro-6-methoxy-6-methylhydrouracil. |
| 3-(decahydro-1-quinolyl)-6-methyluracil | do | 5,5-dichloro-3-(decahydro-1-quinolyl)-6-methoxy-6-methylhydrouracil. |
| 3-(11-azabicyclo[4.4.1]undec-11-yl)-6-methyluracil | do | 3-(11-azabicyclo[4.4.1]undec-11-yl)-5,5-dichloro-6-methoxy-6-methylhydrouracil. |
| 3-(11-azabicyclo[4.4.1]undec-1-en-11-yl)-6-methyluracil | do | 3-(11-azabicyclo[4.4.1]undec-1-en-11-yl)-5,5-dichloro-6-methoxy-6-methylhydrouracil. |
| 6-methyl-3-(2-methyl-3-oxazolidinyl)uracil | Isopropanol | 5,5-dichloro-6-isopropoxy-6-methyl-3-(2-methyl-3-oxazolidinyl)hydrouracil. |
| 3-(hexahydro-2H-1,5-oxazocin-5-yl)-6-methyluracil | Methanol | 5,5-dichloro-3-(hexahydro-2H-1,5-oxazocin-5-yl)-6-methoxy-6-methylhydrouracil. |
| 6-methyl-3-(4-oxazolin-3-yl)uracil | do | 5,5-dichloro-6-methoxy-6-methyl-3-(4-oxazolin-3-yl)hydrouracil. |
| 6-methyl-3-(8-oxa-3-azabicyclo[3.2.1]oct-3-yl)uracil | Ethanol | 5,5-dichloro-6-ethoxy-6-methyl-3-(8-oxa-3-azabicyclo[3.2.1]oct-3-yl)-6-methylhydrouracil. |
| 6-methyl-3-(octahydro-2H-1,3-benzoxazin-3-yl)uracil | do | 5,5-dichloro-6-ethoxy-6-methyl-3-(octahydro-2H-1,3-benzoxazin-3-yl)hydrouracil. |
| 3-(3-benzoxazolinyl)-6-methyluracil | do | 3-(3-benzoxazolinyl)-5,5-dichloro-6-ethoxy-6-methylhydrouracil. |
| 3-(3,4-dihydro-2H-1,3-benzoxazin-3-yl)-6-methyluracil | Methanol | 5,5-dichloro-3-(3,4-dihydro-2H-1,3-benzoxazin-3-yl)-6-methoxy-6-methylhydrouracil. |
| 6-methyl-3-(2-methylthiazolidin-3-yl)uracil | do | 5,5-dichloro-6-methoxy-6-methyl-3-(2-methylthiazolidin-3-yl)hydrouracil. |
| 6-methyl-3-(4-thiazolin-3-yl)uracil | Ethanol | 5,5-dichloro-6-ethyoxy-6-methyl-3-(4-thiazolin-3-yl)hydrouracil. |
| 3-(hexahydro-3-benzothiazolinyl)-6-methyluracil | do | 5,5-dichloro-6-ethoxy-3-(hexahydro-3-benzothiazolinyl)-6-methylhydrouracil. |
| 3-(3-benzothiazolinyl)-6-methyluracil | do | 3-(3-benzothiazolinyl)-5,5-dichloro-6-ethoxy-6-methylhydrouracil. |
| 3-(3,4-dihydro-2H,1,4-benzothiazin-4-yl)-6-methyluracil | do | 5,5-dichloro-3-(3,4-dihydro-2H,1,4-benzothiazin-4-yl)-6-methylhydrouracil. |

The following compounds can be similarly prepared by mixing the appropriately substituted uracil starting reagent and carrying out the reactions in methanol.

3 - (3 - azabicyclo[3.2.2]nonan - 3 - yl) - 5,5 - dichloro-6-methoxy-6-methylhydrouracil 3 - (1 - benzimidazolyl) - 5,5 - dichloro - 6 - methoxy-6-methylhydrouracil 5,5 - dichloro 3 - (4 - hydroxy - 4 - pipecolin - 1 - yl) 6-methoxy-6-methylhydrouracil 5,5 - dichloro - 3 - (2,5 - dimethylpiperazin - 1 - yl) - 6-methoxy-6-methylhydrouracil 5,5 - dichloro - 3 - (3 - hydorxypiperidin - 1 - yl) - 6-methoxy-6-methylhydrouracil 5,5 - dichloro - 3 - [(2 - hydroxy - 1,1 - dimethylethyl)-1-pyrrolidinyl]-6-methoxy-6-methylhydrouracil

EXAMPLE 2

5,5-dibromo-3-(hexahydro-1-azepinyl)-6-hydroxy-6-methylhydrouracil

A suspension of 7.4 parts by weight of 3-(hexahydro-1 - azepinyl) - 6 - methyluracil in 100 parts of water is stirred at 20–25° C. while 15.6 parts of bromine is added over about 10 minutes. The slurry is stirred an additional hour then filtered and the solid washed well with water. The resulting 5,5 - dibromo - 3 - (hexahydro - 1 - azepinyl) - 6 - hydroxy - 6 -methylhydrouracil is sufficiently pure for herbicidal formulation.

By substituting equivalent amounts of the appropriate starting uracil for the 3 - (hexahydro - 1 - azepinyl) - 6-methyluracil set forth above, the hydrouracils of Table II can be prepared.

TABLE II

| Starting Uracil | Hydrouracil Product |
|---|---|
| 3-(hexahydro-1-azepinyl)-6-ethyluracil | 5,5-dibromo-6-ethyl-3-(hexahydro-1-azepinyl)-6-hydroxyhydrouracil. |
| 6-methyl-3-(4-morpholino)uracil | 5,5-dibromo-6-hydroxy-6-methyl-3-(4-morpholino)hydrouracil. |
| 6-methyl-3-(1-piperidino)uracil | 5,5-dibromo-6-hydroxy-6-methyl-3-(1-piperidino)hydrouracil. |
| 6-ethyl-3-(1-piperidino)uracil | 5,5-dibromo-6-ethyl-6-hydroxy-3-(1-piperidino)hydrouracil. |
| 6-methyl-3-(1-pyrrolidinyl)uracil | 5,5-dibromo-6-hydroxy-6-methyl-3-(1-pyrrolidinyl)hydrouracil. |
| 3-(dihydro-1,3,5-dithiazin-5-yl)-6-methyluracil | 5,5-dibromo-3-(dihydro-1,3,5-dithiazin-5-yl)-6-hydroxy-6-methylhydrouracil. |
| 6-methyl-3-(1,2,3,6-tetrahydro-1-pyridyl)uracil | 5,5-dibromo-6-hydroxy-6-methyl-3-(1,2,3,6-tetrahydro-1-pyridyl)hydrouracil. |
| 6-ethyl-3-(4-methyl-1-piperazinyl)uracil | 5,5-dibromo-6-ethyl-6-hydroxy-3-(4-methyl-1-piperazinyl)hydrouracil. |
| 3-(2,5-dimethyl-4-morpholino)-6-methyluracil | 5,5-dibromo-3-(2,5-dimethyl-4-morpholino)-6-hydroxy-6-methylhydrouracil. |
| 6-methyl-3-(1-pyrrolyl)uracil | 5,5-dibromo-6-hydroxy-6-methyl-3-(1-pyrrolyl)hydrouracil. |
| 3-(3-azabicyclo[3.2.2]nonan-3-yl)-6-methyluracil | 3-(3-azabicyclo[3.2.2]nonan-3-yl)-5,5-dibromo-6-hydroxy-6-methylhydrouracil. |
| 6-methyl-3-(2-methyl-3-oxazolidinyl)uracil | 5,5-dibromo-6-hydroxy-6-methyl-3-(2-methyl-3-oxazolidinyl)hydrouracil. |
| 3-(3-benzoxazolinyl)-6-methyluracil | 3-(3-benzoxazolinyl)-5,5-dibromo-6-hydroxy-6-methylhydrouracil. |
| 3-(3-benzothiazolinyl)-6-methyluracil | 3-(3-benzothiazolinyl)-5,5-dibromo-6-hydroxy-6-methylhydrouracil. |

The following examples illustrate preparation and use formulations incorporating the herbicidally active compounds of the invention.

EXAMPLE 3.—AQUEOUS SUSPENSION

| | Percent |
|---|---|
| 5,5 - dichloro - 3 - (hexahydro - 1 - azepinyl) - 6-ethoxy - 6 - methylhydrouracil | 28.0 |
| Sodium lignin sulfonate | 15.0 |
| Hydrated attapulgite | 2.0 |
| Disodium phosphate | 0.8 |
| Sodium pentachlorophenate | 0.5 |
| Water | 53.7 |

The above dry ingredients are ground to pass a 30-mesh screen and are then mixed and pebble-milled or sand-milled with the remainder of the ingredients until the average particle size of the active material is substantially less than 5 microns. The resulting stable thixotropic suspension does not cake, and can be readily diluted with water to form a dilute, very slowly settling suspension which requires no agitation during application.

This aqueous suspension, applied as a directed spray at 2 to 4 pounds of active ingredient per acre in 30 gallons of water, gives good pre-emergence control of barnyardgrass, foxtail, crabgrass, and jungle rice grass growing along the edge of sugar cane fields.

EXAMPLE 4.—AQUEOUS DISPERSION

| | Percent |
|---|---|
| 5,5 - dichloro - 6 - methoxy - 6 - methyl - 3 - (1-piperidino)hydrouracil | 13.00 |
| Pentachlorophenol | 16.00 |
| Sodium lignin sulfonate | 15.00 |
| Hydrated attapulgite | 1.75 |
| Water | 54.25 |

This formulation is wet-milled until the particles are substantially all below 10 microns in size, to yield a stable dispersion. An application of this formulation in 40 gallons of water at the rate of 35 pounds (active) per acre gives control of annual and perennial broadleaf and grass weeds such as wild mustard, chickweed, foxtail and crabgrass in fire-break paths.

EXAMPLE 5.—OIL CONCENTRATE

| | Percent |
|---|---|
| 5,5 - dichloro - 6 - ethoxy - 6 - methyl - 3 - (1-pyrrolidinyl)hydrouracil 1:1 complex with meta-cresol | 25 |
| Heavy aromatic naphtha | 75 |

The oil concentrate is prepared by dissolving the active in the oil. The concentrate can be easily diluted to use levels with herbicidal oils and sprayed.

Four pounds of active ingredient per acre in 40 gallons of oil gives excellent pre-emergence control foxtail, barnyard grass, and Johnsongrass seedlings. These formulations, at 45 pounds of active ingredient per acre, are also useful for general control of annual and perennial weeds on industrial sites and railroad ballast.

EXAMPLE 6.—EMULSIFIABLE OIL

| | Percent |
|---|---|
| 5,5-dibromo-6-hydroxy-6-methyl-3 - (1 - piperidino)hydrouracil | 20.0 |
| Alkyl aryl polyether alcohol | 2.5 |
| Oil soluble petroleum sulfonate | 2.5 |
| Methyl isobutyl ketone | 65.0 |

The emulsifiable oil is prepared by mixing the above components until a homogeneous solution results. It can then be emulsified in water for application.

This emulsifiable oil is useful for weed control on railroad rights-of-way, in railroad yards, and on sidings. When this composition is diluted with 100 gallons of water per acre and sprayed from a railroad spray train at 15 pounds of active ingredients per acre, mixed vegetatian such as crabgrass, quackgrass, bromegrass, ragweed, coclkeburr, lambsquarters, and marestail is controlled for an extended period.

EXAMPLE 7.—EMULSIFIABLE OIL SUSPENSION

| | Percent |
|---|---|
| 5,5-dichloro-6-methyl - 6 - methoxy - 3 - (4 - morpholino)hydrouracil | 25 |
| Blend of polyalcohol carboxylic acid esters and oil-soluble petroleum sulfonates | 6 |
| Diesel oil | 69 |

The above components are mixed together, and milled in a roller mill, pebble mill, or sand mill until the particles of the active component are substantially all below 10 microns in size. The resulting suspension can be emulsified in water or diluted further with weed oils for spray application.

This formulation is diluted with 80 gallons of Lion Herbicidal Oil No. 6 and applied at 15 to 25 pounds of active ingredient per acre for the control of weeds such as morningglory, chickweed, pigweed, lambsquarters, yarrow, ragweed, milk carrot, quackgrass, witchgrass, Indiangrass, crabgrass, and willow, oak, and maple seedlings growing along railroads. Excellent control is obtained.

EXAMPLE 8.—TANK MIXES (A) Fourteen pounds of 5,5 - dichloro - 6 - ethoxy - 6-methyl-3-(hexahydro-1-azepinyl)hydrouracil as an 80% wettable powder and 3 pounds of 4-6-dinitro-ortho-secondary butylphenol in 4 gallons of oil are blended as a tank mix and applied at 17 pounds of active herbicide per acre in 100 gallons of water to weeds growing along boardwalks. Excellent kill of annual and perennial broadleaf and grass weeds is obtained.

(B) Eighteen pounds of an 80% water-dispersible powder formulation of 5,5-dibromo-6-ethyl-6-hydroxy-3-(4-morpholino)hydrouracil and 24 pounds of 2,2-dichloropropionic acid, sodium salt, 85% are dispersed and mixed in 100 gallons of water.

This composition is used for the control of perennial grasses and broadleaf weeds on railroad rights-of-way. An application of 100 gallons of this formulation per acre gives good control of seedling Johnsongrass, Bermudagrass, nutsedge, foxtails, crabgrass, chickweed, ragweed, and beggarticks.

(C) Twenty-five pounds of an 80% water dispersible powder formulation of 3-[azabicyclo(3.2.2)nonan-3-yl]-5,5-dichloro-6 - methoxy - 6 - methylhydrouracil and 25 pounds of 2,2-dichloropropionic acid, sodium salt (85%) are dispersed and mixed in 50 to 100 gallons of water. This composition, sprayed on one acre, gives good control of both annual and perennial grasses and broadleaf weeds growing along railroad rights-of-way and around loading dock installations.

Such difficult-to-kill weeds as crabgrass, curly dock, ragweed, pigweed goatweed, carpetweed, yarrow, lambsquarters, beggarticks, Spanishneedle, nightshade, black medic, knotweed, plantain, spotted spurge, and velvetleaf are controlled by this application.

(D) Fifteen pounds of 5,5-dichloro-3-(2,5-dimethylpiperazin-1-yl)-6-methoxy - 6 - methylhydrouracil as an 80% wettable powder and 35 pounds of ammonium sulfamate are blended as a tank mix.

This composition controls annual and perennial weeds around oil tanks and along roadsides.

An application of 50 pounds per acre (active) in 100 gallons of water controls annuals and perennial broadleaf and grass weeds, giving contact action and residual weed control. Weeds controlled by this treatment include crabgrass, muhlenbergia, broomsedge, cockleburr, ragweed, flower-of-an-hour, and oak maple, and sweet gum seedlings.

Solid compositions

EXAMPLE 9.—WETTABLE POWDER

| | Percent |
|---|---|
| 5,5-dichloro-3-(hexahydro-1-azepinyl)-6 - methoxy-6-methylhydrouracil | 90.0 |
| Alkyl naphthalene sulfonate, Na salt | 2.0 |
| Low viscosity methyl cellulose | 0.3 |
| Attapulgite clay | 7.7 |

These components are blended and micro-pulverized until the particles of uracil have been reduced below 50 microns in diameter, then reblended.

This formulation gives excellent weed control when applied pre-emergence or early post-emergence at rates of 4–6 pounds per acre to crabgrass, wild oats, wild mustard, volunteer alfalfa, foxtail, and lambsquarters.

EXAMPLE 10.—GRANULES

| | Percent |
|---|---|
| 5,5-dichloro-6-butoxy - 6 - methyl - 3 - (tetrahydro-1,4-thiazin-4-yl)hydrouracil | 10 |
| Attapulgite granules (15–30 mesh) | 90 |

The active component is dissolved in warm xylene to give a 25% solution which is sprayed on the clay granules which are tumbled in a mixer.

After removal of the solvent, the granules are ready for application.

The granules are applied conveniently by hand for spot treatment of undesirable bunch grasses growing in agricultural areas. An application of 25 pounds of active ingredient per acre gives good control of orchardgrass, purpletop, and Kentucky 31 fescue.

EXAMPLE 11.—PELLETS OR GRANULES

| | Percent |
|---|---|
| 3 - (1 - aziridinyl) - 5,5-dichloro-6-ethyl-6-methoxyhydrouracil | 25 |
| Anhydrous sodium sulfate | 10 |
| Sodium lignin sulfonate | 10 |
| Non-swelling sub-bentonite clay | 55 |

The components are blended and micropulverized, then moistened with 18–20% water and extruded through die holes. The extrusions are cut as formed to give pellets and dried. Granules can also be obtained by passing the extrusions through a Stokes granulator fitted with the desired screens.

These pellets or granules are useful for weed control along highway guard rails, around utility poles, around bridges, cyclone fences, and highway signs. They are applied conveniently by hand methods at 15 to 30 pounds of active ingredient per acre. Excellent control of seedling stands such as oak, maple, sweet gum, and willow is obtained. Good control of veronica, ragweed, lambsquarters, foxtail, chickweed, henbit, and crabgrass.

EXAMPLE 12.—WETTABLE POWDER

| | Percent |
|---|---|
| 5,5 - dibromo - 6-hydroxy-6-methyl-3-(1-piperidino)hydrouracil | 80.0 |
| Sodium lauryl sulfate | 0.6 |
| Sodium lignin sulfonate | 2.0 |
| Kaolin clay | 17.4 |

The components are blended and then micropulverized until the solids are substantially all below 50 microns in particle size. The mixture is then reblended until it is homogeneous.

This wettable powder is used as a general purpose weed killer on industrial sites and railroad ballast. Fifteen to twenty-five pounds of active ingredient per acre in 100 gallons water gives excellent control of eveningprimrose, pokeweed, oxeye daisy, cockleburr, goosegrass, foxtail, crabgrass, and lovegrass.

EXAMPLE 13.—WETTABLE POWDER

| | Percent |
|---|---|
| 5,5 - dichloro - 6-ethoxy-6-methyl-3-(1-piperidino)hydrouracil | 50 |
| Sodium alkylnaphthalenesulfonate | 2 |
| Sodium ligninsulfonate | 2 |
| Attapulgite clay | 46 |

The components are blended and then micropulverized until the solids are substantially all below 50 microns in particle size. The mixture is then reblended until it is homogeneous. Application of this formulation at a rate of 30 pounds (active) in 80 gallons of water per acre controls annual and perennial broadleaf and grass weeds such as quackgrass, giant foxtail, ragweed, and lambsquarters.

The compounds of Examples 1 and 2 can be formulated in similar fashion and applied with similar results.

What is claimed is:

1. A method for the control of undesirable vegetation, said method comprising applying to a locus to be protected a herbicidally effective amount of the compound of the formula $$\begin{matrix} & O & \\ & \| & X \\ A\ N-N & & X \\ & & \\ & O= & R \\ & N & OR_1 \\ & H & \end{matrix}$$

wherein $$A\ N-$$

is azacycloalkyl of 3 through 8 ring atoms, azacycloalkenyl of 5 through 7 ring atoms, azabicycloalkyl of 7 through 11 ring atoms, azabicycloalkenyl of 9 through 11 ring atoms, diazacycloalkyl of 5 through 8 ring atoms, diazabicycloalkenyl of 7 through 11 ring atoms, azaoxacycloalkyl of 5 through 8 ring atoms, azaoxacycloalkenyl of 5 through 8 ring atoms, azaoxabicycloalkyl of 8 through 10 ring atoms, azadioxacycloalkyl of 5 through 8 ring atoms, azaoxabicycloalkenyl of 9 through 11 ring atoms, azathiacycloalkyl of 5 through 7 ring atoms, azathiacycloalkenyl of 5 through 7 ring atoms, azadithiacycloalkyl of 5 through 8 ring atoms, azathiabicycloalkyl of 9 and 10 ring atoms, or azathiabicycloalkenyl of 9 and 10 ring atoms; provided that the $$A\ N-$$

group consisting of hydroxy, alkyl of 1 through 4 carbon to the uracil nucleus; and further provided that the $$A\ N-$$

group can be substituted with a member selected from the group consisting of hydroxy, alkyl of 1 through 4 carbon atoms, and hydroxy alkyl of 1 through 4 carbon atoms;

X is chlorine or bromine;

R is methyl or ethyl;

$R_1$ is hydrogen or alkyl of 1 through 4 carbon atoms; provided that when $R_1$ is alkyl, X is chlorine and when $R_1$ is hydrogen, X is bromine.

2. The method of claim 1 wherein the compound is applied with a surface-active agent.

3. The method of claim 1 wherein the compound is applied with an inert carrier.

4. A method for the control of undesirable vegetation, said method comprising applying to a locus to be protected a herbicidally effective amount of the compound of the formula

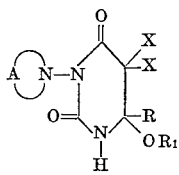

wherein

is azacycloalkyl of 5 through 7 ring atoms or azaoxycycloalkyl of 5 and 6 ring atoms; provided that the

group must contain one nitrogen atom bonding the group to the uracil nucleus; and further provided that the

group can be substituted with a member selected from the group consisting of hydroxy, alkyl of 1 through 4 carbon atoms, and hydroxy alkyl of 1 through 4 carbon atoms;
X is chlorine or bromine;
R is methyl or ethyl;
$R_1$ is hydrogen or alkyl of 1 through 4 carbon atoms; provided that when $R_1$ is alkyl, X is chlorine and when $R_1$ is hydrogen, X is bromine.

5. The method of claim 1 wherein the active compound is 5,5 - dichloro - 3-(hexahydro-1-azepinyl)-6-methoxy-6-methylhydrouracil.

6. The method of claim 1 wherein the active compound is 5,5 - dibromo-6-hydroxy-6-methyl-3-(1-piperidino)-hydrouracil.

7. The method of claim 1 wherein the active compound is 5,5 - dichloro - 6-methoxy-6-methyl-3-(1-piperidino)hydrouracil.

8. The method of claim 1 wherein the active compound is 5,5 - dibromo-6-hydroxy-6-methyl-3-(1-pyrrolidinyl-hydrouracil.

9. The method of claim 1 wherein the active compound is 5,5-dichloro-6-methoxy-6-methyl-3-(1-pyrrolidinyl)hydrouracil.

10. The method of claim 1 wherein the active compound is 5,5 - dibromo - 3-(hexahydro-1-azepinyl)-6-hydroxy-6-methylhydrouracil.

11. The method of claim 1 wherein the active compound is 5,5 - dichloro - 6-methoxy-6-methyl-3-(1-piperazinyl)hydrouracil.

12. The method of claim 1 wherein the active compound is 5,5 - dichloro-6-methoxy-6-methyl-3-(4-morpholino)hydrouracil.

References Cited
UNITED STATES PATENTS 2,969,364   1/1961   Lyttle.
3,002,975   10/1961   Slezak.
3,235,357   2/1966   Loux.

JAMES. O. THOMAS, JR, *Primary Examiner.*